United States Patent [19]

Krecioch et al.

[11] 3,766,364

[45] Oct. 16, 1973

[54] CODED DATA SENSING SYSTEM

[75] Inventors: Theodore H. Krecioch, Hemel Hempstead; Laurence J. Pyzer, London, both of England

[73] Assignee: The National Cash Register Company, Dayton, Ohio

[22] Filed: Feb. 11, 1972

[21] Appl. No.: 225,402

[30] Foreign Application Priority Data

Apr. 21, 1971 Great Britain .................. 10,391/71

[52] U.S. Cl. 235/61.11 E, 250/219 D, 340/146.3 Z
[51] Int. Cl. ............................................ G06k 7/10
[58] Field of Search .................... 235/61.11 E, 11 R, 235/11 D, 11 A, 11 F, 61.12 R; 340/146.3 Z, 146.3 K; 250/219 D, 219 DC

[56] References Cited

UNITED STATES PATENTS

| | | | |
|---|---|---|---|
| 3,610,891 | 10/1971 | Raciazek | 235/61.11 E |
| 3,617,707 | 11/1971 | Shields et al. | 235/61.11 E |
| 3,539,989 | 10/1970 | Hanchett, Jr. et al. | 235/61.11 F |
| 3,573,432 | 4/1971 | Murray et al. | 235/61.11 R |
| 3,716,699 | 2/1973 | Eckert et al. | 235/61.11 E |

OTHER PUBLICATIONS

IBM Tech. Disl. Bull'n. entitled "Tripod Hand Scanner," by J. Jones, Vol. 13 No. 8, January 1971, page 2211.

*Primary Examiner*—Thomas A. Robinson
*Attorney*—J. T. Cavender et al.

[57] ABSTRACT

There is disclosed a record member encoded by having alternating black and white bars, each of which may assume a wide or a narrow width, which respectively represent binary 1 and binary 0 digits. There is also disclosed a probe for reading the described record member. The probe includes three light detecting means for providing signals indicating the colors detected at three points which form the vertices of an equilateral triangle. The dimensions of this triangle are such that (1) it can never be entirely within a single narrow bar, (2) it can never span two narrow bars, and (3) it must be capable of being contained within a wide bar. Logic is also disclosed for processing the detecting means signals to obtain the encoded information.

12 Claims, 7 Drawing Figures

CODED DATA SENSING SYSTEM

This invention relates to a data sensing system and more particularly to a system for reading a code having contiguous bars of alternating colors and varying widths.

U.S. Pat. No. 3,543,007, entitled "Automatic Car Identification System" by E. F. Brinker, et al, discloses a record member having alternating black and white bars or stripes, where each bar may be either wide or narrow. This record member can be used to convey binary information to designating each wide bar as a binary 1 digit and each narrow bar as a binary 0 digit.

One major advantage of this type of record member is the elimination of a timing bar between adjacent data conveying bars such as is disclosed in U.S. Pat. No. 3,359,405 entitled "Data Record and Sensing Means Therefore," by G. E. Sundblad, and British Pat. No. 1, 138,977 entitled "Data Carrier and Procedure for Reading of Same." This type of encoding allows more data to be placed in a given space.

One use for a record member of this type is as a price tag in an automatic checkout of merchandise system used in a business establishment. This may be accomplished by having a clerk scan the encoded tag with a hand held probe, thereby automatically causing sales information, such as price and inventory control numbers, to be entered into a sales terminal. The probe must thus be capable of scanning the encoded portion of the tag despite varying velocities, certain angular inclinations from the perpendicular and certain rotary movement.

In accordance with one preferred embodiment of this invention, there is provided a code reading system for reading a record member having contiguous indicia of alternating first and second detectable characteristics, each of the indicia having a width along a given reading path which is either a first or a different second distance. The system includes a leading and a lagging transition detecting means for detecting indicia characteristic changes of the record member. At least one of the transition detecting means detects along the path and each of the transition detecting means provides a signal as it detects a characteristic change from one indicia to the next adjacent indicia. Each of the transition detecting means further detects points on the member which are separated from one another along a line parallel to the path by a distance which is between the first and second distances. The system further includes logic means responsive to the signals provided by the transition detecting means for determining, after each leading transition detecting means signal is provided, whether the next occurring transition detecting means signal is provided by the leading or the lagging transition detecting means.

In accordance with a second preferred embodiment of this invention, there is provided a probe for being scanned across a record member having a plurality of contiguous indicia of alternating first and second detectably different characteristics, some of the indicia having a first width and the remaining ones of the indicia having a wider second width. The probe includes first, second and third detecting means each being capable of detecting indicia characteristics as the probe is scanned across the member and providing signals indicating detection of a characteristic change. Each of the first, second and third detecting means are positioned within the probe so that at any given time during the scan, respective first, second, and third points on the member are detected. The first, second and third detecting means further are positioned so that the first, second and third points are (1) incapable of all being contained within an indicium of the first width, (2) are incapable of spanning two contiguous indicia, and (3) are capable of being contained within an indicium of the second width.

One embodiment of the present invention will now be described by way of example, with reference to the accompanying drawings in which.

Figure 1:
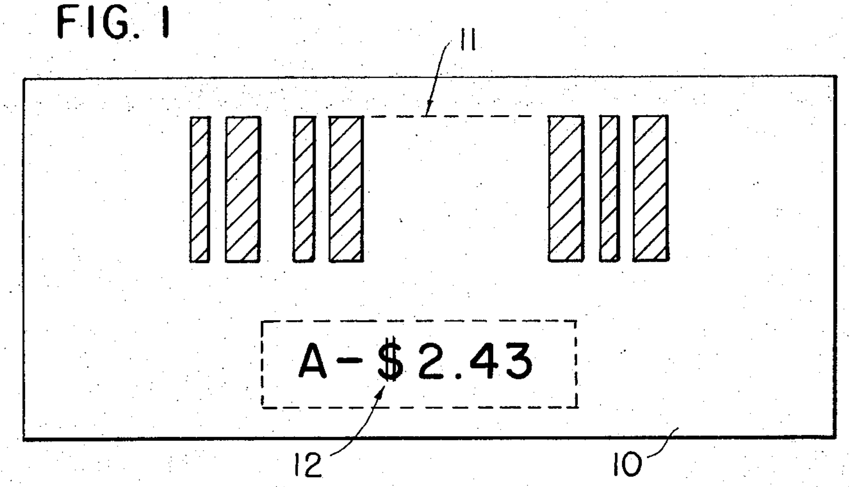
FIG. 1 is a general view of a record member in the form of a label.

Referring first to FIG. 1, there is shown a record member in the form of a label 10 suitable for attachment to an article in a retail shop. The label 10 contains encoded data 11 representing for instance the price of the article, the class of the article, the department of the shop, and other relevant data. The label may also contain legible characters 12 representing the encoded data 11.

The nature of the decoding will be explained by reference to FIG. 2, which shows encoded data in the form of two decimal digits coded in a binary-coded decimal code. The elements of the code take the form of alternate black and white bars. Each bar is of one of two different widths, the bars 22, 25, 26, 28, and 30 being wide bars, and the bars 20, 21, 23, 24, 27 and 29 being narrow bars. A wide bar always represents a binary 1 and a narrow bar always represents a binary 0, irrespective of whether the bars are black or white.

It will be appreciated that the white bars are formed by the background of the label 10, so that the code can be printed by printing the black bars only. Also, it should be understood that, instead of black and white, two other colors having suitable different light reflection characteristics could be used for the alternate bars.

Figure 2:
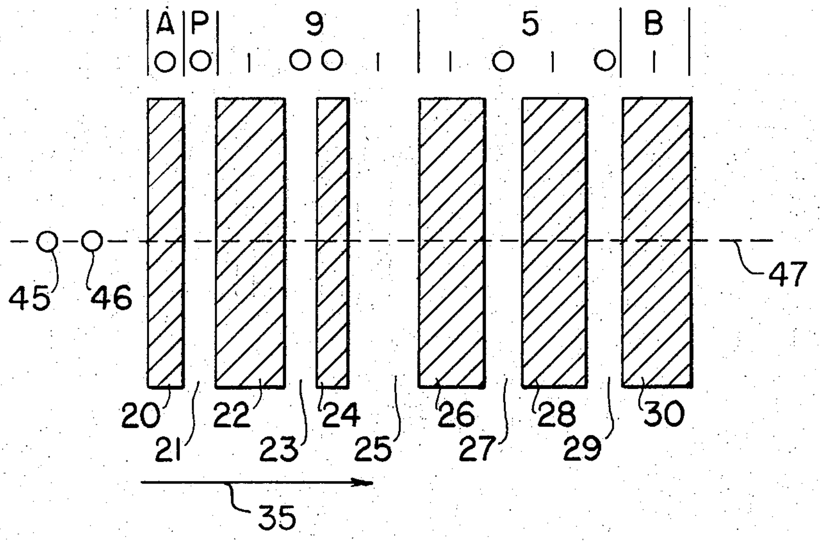
FIG. 2 is an enlarged view of an example of the encoded data portion of the label shown in FIG. 1.

Starting from the left end of the coded data and proceeding in the direction of the arrow 35 in FIG. 2, the first bar encountered is a narrow black bar 20, representing a binary 0. The next bar encountered is a narrow white bar 21, representing a binary 0, and the one following is a wide black bar 22, representing a binary 1. The binary digit represented by each bar is shown immediately above the relevant bar.

The decimal digits 9 and 5 are shown in FIG. 2 in binary coded form as 1001 and 0101 respectively, the bits encountered in the direction of the arrow 35 being the $2^0$, $2^1$, $2^2$ and $2^3$ bits respectively.

The first bit encountered in the direction of the arrow 35 is a 0 bit represented by the narrow black bar 20 and constituting a start code A. The last bit encountered in the same direction is a 1 bit represented by the wide black bar 30 which constitutes a finish code B. It will be appreciated that the start code A and the finish code B can be used to give an indication of the direction in which the label is being sensed, thereby enabling the label to be scanned in either direction and interpreted correctly, as explained in more detail below. A further point regarding the code used in the present embodiment is that both the first and last bars in the code must be black, since if either one where white it would not be distinguishable from the background. To ensure that this requirement is met in the present example, a parity bit P in the form of the narrow white bar 21 is included to make the total number of bits encoded on the record medium odd. Clearly, in certain circumstances, for instance if the data already included an odd number of bits, the parity bit P would be omitted.

Figures 4, 5:
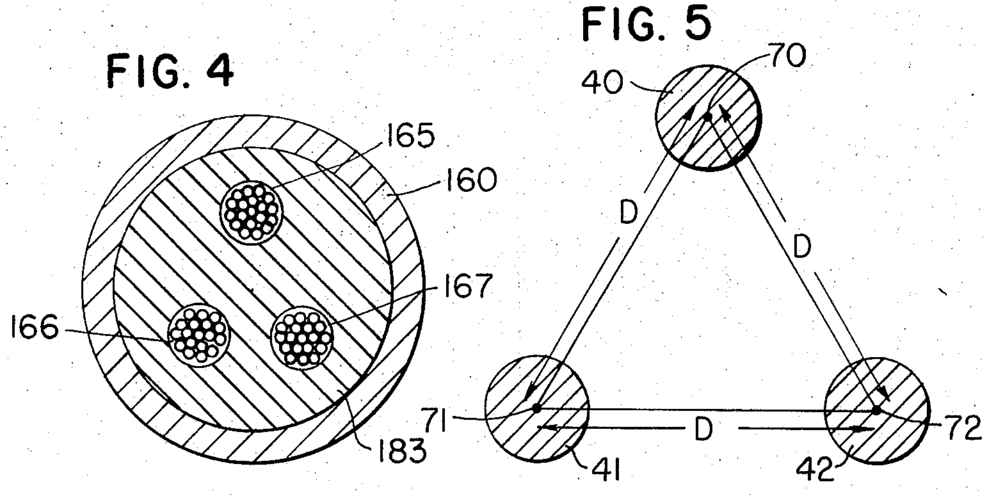
FIG. 4 is an enlarged cross-sectional view taken along the line IV — IV of FIG. 3.
FIG. 5 is a plan view of the areas on the label which are sensed by the probe shown in FIG. 3.
Figures 3, 6:
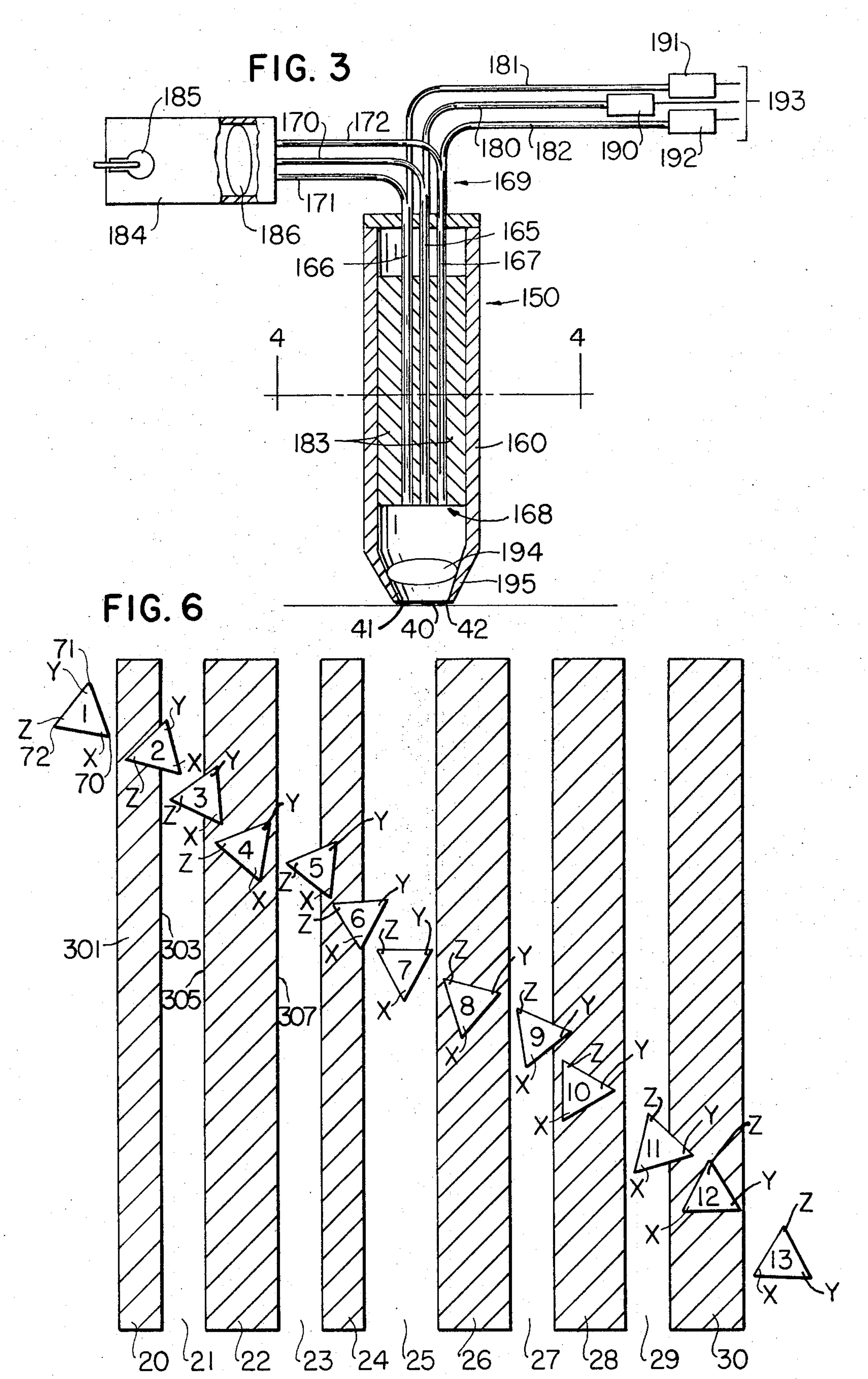
FIG. 3 is a schematic cross-sectional view of one form of manually operable sensing probe for scanning the encoded data on the label of FIG. 1.
FIG. 6 is a diagrammatic view showing successive positions of the areas sensed by the probe as it scans across the encoded data.

Referring now to FIG. 3, the label described above can be sensed by a manually operable probe 150. The probe 150 includes a housing 160 which contains three bundles of optical fibres 165, 166, 167 extending from a location 168 within the housing 160 to a location 169 outside the housing 160 where each bundle 165, 166, 167 bifurcates into respective bundles 170, 180, 171, 181 and 172, 182. The fibre bundles 165, 166, 167 are maintained in position within the housing 160 by a support medium 183, as shown generally in the cross-sectional view of FIG. 4. The bundles 170, 171, 172 are coupled to a light source 184 which includes a tungsten filament lamp 185 and condensing lens 186, and the bunles 180, 181, 182 are coupled to respective photosensors 190, 191, 192 which are connected by leads 193 to the decoding circuit shown in FIG. 7. The optical fibre bundles 170, 171, 172 and 165, 166, 167 are arranged to direct light from the source 184 to a focusing device shown as a single lens 194 which focuses the light onto the areas 40, 41, 42 of the label 10, as shown in FIG. 5. The photosensors 190, 191 and 192 are arranged to receive light reflected from these areas and transmitted to the photosensors via the optical bundles 165, 166, 167 and 180, 181, 182. The tip 195 of the housing 190 extends beyond the lens 194 to contact the label 10 when a sensing operation is being effected. As a modification of the probe shown in FIG. 3, it would be possible for the light source 184 and/or the photosensors 190, 191, 192, to be located within, instead of outside, the housing 160.

Referring again to FIG. 5, the three areas 40, 41, 42 on the label 10 are positioned with their center at the vertices 70, 71, 72 of an equilateral triangle each of the distances 70–71; 71–72; and 72–73 being equal to D.

The relative dimensions of the width S1 of the narrow bars, the width S2 of the wide bars, and the side D of the equilateral triangle are subject to the following three conditions: (1) the points 70, 71 and 72 must never all be contained within a narrow bar; (2) the three points 70, 71, 72 must never completely span two adjacent narrow bars; and (3) the three points 70, 71, 72 must never completely span a wide bar.

A further factor to be considered is the effect of a possible inclination of the probe 150 to the perpendicular to the label 10. If $\theta_{max}$ is the maximum permissible value of this inclination, then the following inequalities will interconnect the maximum value of S1 and the minimum values of S1 and S2:

$$D > \sqrt{2/3}\, S1_{max} \qquad (1)$$

$$D < 2(\cos\theta_{max}) \cdot S1_{min} \qquad (2)$$

$$D < (\cos\theta_{max}) \cdot S2_{min} \qquad (3)$$

where the inequalities (1), (2) and (3) correspond to the above conditions (1), (2) and (3).

The sensing and decoding operation of the record system will now be described with reference to FIGS. 6 and 7 and TABLE I below. Shown in FIG. 6 are 13 successive positions of the equilateral triangle 70, 71, 72, the regions on the label which are sensed being here labelled as *x, y, z* for convenience.

Figure 7:
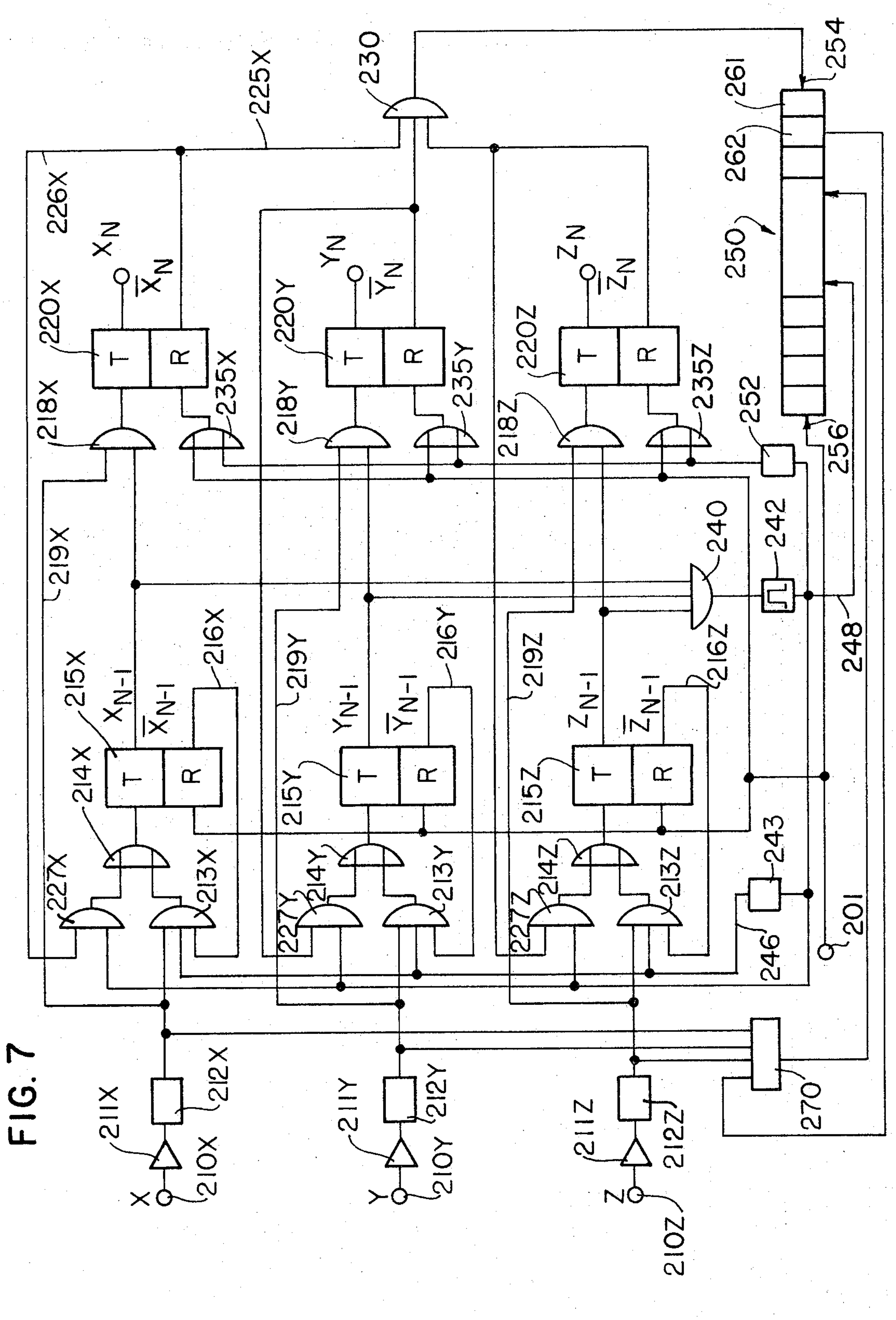
FIG. 7 is a block diagram of a decoding circuit for decoding the sensed data.

The decoding circuit of FIG. 7 employs flip-flops of the kind including a bistable circuit having two stable states which may be referred to as the "set" or "true" and "reset" or "false" states, and having a trigger input T such that a true to false transition on this input is always effective to switch the state of the flip-flop from its current state to the opposite state, and a reset input R, a false to true transition on which is effective, if the flip-flop is in the set state, to switch it to the reset state. Each flip-flop also has a set output and a reset output, and the arrangement is such that when the flip-flop is in a true state the set and reset outputs are true and false respectively, and that when the flip-flop is in a false state the set and reset outputs are false and true respectively.

The decoding circuit includes an input terminal 210$x$ connected to the output of the photosensor 190 (FIG. 3). The terminal 210$x$ is coupled to an amplifier 211$x$ which is coupled to a shaping device 212$x$, the device 212$x$ being arranged to produce a pulse at a true level in response to each color transition (i.e., each change from black to white or from white to black) sensed by the photosensor 190. In practice the photosensor 190 senses such transition when the center of the corresponding area 40 on the label passes a boundary between adjacent bars. The output of the shaping device 212$x$ is coupled to an AND gate 213$x$ whose output is connected to an OR gate 214$x$. The output of the OR gate 214$x$ is connected to a trigger input of a flip-flop 215$x$ which has a set output $X_{n-1}$ and a reset output $\overline{X}_{n-1}$, the latter being coupled back via a lead 216$x$ to the gate 213$x$. The set output $X_{n-1}$ is connected to an input of an AND gate 218$x$ which has a second input connected by a lead 219$x$ to the output of the shaping device 212$x$. The output of the AND gate 218$x$ is connected to a trigger input of a flip-flop 220$x$.

The flip-flop 220$x$ has a set output labelled $X_n$ and a reset output labelled $\overline{X}_n$. The output $\overline{X}_n$ is connected via a lead 225$x$ to an input of an AND gate 230, and via a lead 226$x$ to an input of an AND gate 227$x$, the output of which is connected to an input of the OR gate 214$x$.

Coupled to the reset input of the flip-flop 220$x$ is the output of an OR gate 235$x$ which has a first input connected to a reset terminal 201, the latter being also connected to the reset input of the flip-flop 215$x$.

A similar arrangement of gates and flip-flops is provided for the *y* photosensor 191 and the *z* photosensor 192, and accordingly these arrangements will not be described in detail. It should be noted, however, that the arrangement for the $y$ photosensor includes flip-flops 215$y$ and 220$y$ and the arrangement for the $z$ photosensor includes flip-flops 215$z$ and 220$z$.

The outputs $X_{n-1}$, $Y_{n-1}$ and $Z_{n-1}$ from the flip-flops 215$x$, 215$y$ and 215$z$ are also connected to an AND gate 240 whose output is connected to a pulse generator 242 which may be a one-shot device. The pulse generator 242 is arranged to produce a true level pulse of predetermined duration at its output in response to the application of a true level pulse to its input. The output of the pulse generator 242 is connected directly to inputs to the gates 227$x$, 227$y$ and 227$z$ and via an inverter 243 and a lead 246 to inputs to the gates 213$x$, 213$y$ and 213$z$. The output of the pulse generator 242 is also connected to a shift input of a shift register 250 and, via a delay device 252, to inputs of the gates 235$x$, 235$y$ and 235$z$.

The output of the gate 230 is connected to a data input 254 coupled to the first stage 261 of the shift register 250. The reset terminal 201 is connected to a reset input 256 of the shift register 250.

The outputs of the shaping devices 212$x$, 212$y$ and 212$z$ are connected to a control circuit 270 which, in turn, is connected to the shift register 250. The control circuit 270 is also connected to receive an input from the second stage 262 of the shift register 250.

The operation of the decoding circuit of FIG. 7 will now be described.

Initially, a reset pulse at the terminal 201 resets all the flip-flops 215$x$, 215$y$, 215$z$, 220$x$, 220$y$ and 220$z$ to their false states and also resets the shift register 250 to 0 in all its stages.

Assuming that the probe is initially in position 1, FIG. 6, the operation of the circuit as the probe moves to position 2 will be described. It should first be observed that, in the initial state, the output of the pulse generator 242 is at a false level so that the gates 213$x$, 213$y$ and 213$z$ are enabled by the output of the inverter 243, and the gates 227$x$, 227$y$ and 227$z$ are disabled. Also, the gates 218$x$, 218$y$ and 218$z$ are disabled by false levels signals on the outputs $X_{n-1}$, $Y_{n-1}$ and $Z_{n-1}$ of these flip-flops 215$x$, 215$y$, 215$z$. When the point 70 crosses the leading boundary 301 of the first bar 20, a true level pulse is produced at the output of the shaping device 212$x$ so that a true level pulse is applied to the trigger input of the flip-flop 215$x$ via the gates 213$x$ and 214$x$ since the inputs to the gate 213$x$ via the leads 246 and 216$x$ are both true. The flip-flop 215$x$ is therefore set to its true state by the trailing edge of the pulse from the device 212$x$. When the point 71 crosses the boundary 301, the flip-flop 215$y$ is set to its true state by the trailing edge of the pulse produced by the device 212$y$. Next, the point 70 crosses the boundary 303, thereby causing a pulse to be applied via the lead 219$x$ and AND gate 218$x$, which is enabled by virtue of the set output $X_{n-1}$ of the flip-flop 215$x$ now being true, to set the flip-flop 220$x$ to the true state. The flip-flop 215$x$ is not affected by this pulse since the AND gate 213$x$ is disabled via the lead 216$x$, the output $\overline{X}_{n-1}$ now being false. Next, the point 71 crosses the boundary 303 and the flip-flop 220$y$ is set to its true state. At this time, therefore, the flip-flops 215$x$, 215$y$, 220$x$ and 220$y$ are all set to their true states.

Next, the point 72 crosses the boundary 301, thereby setting the flip-flop 215$z$ to its true state. The set outputs $X_{n-1}$, $Y_{n-1}$, $Z_{n-1}$, are now all true so that the AND gate 240 is opened to activate the pulse generator 242 and thereby initiate a decoding operation. At this time the inputs to the AND gate 230 from the reset outputs of $\overline{X}_n$, $\overline{Y}_n$, $\overline{Z}_n$ of the flip-flops 220$x$, 220$y$ and 220$z$ are respectively false, false and true. The gate 230 is therefore closed and a false input is applied to the input 254 of the shift register 250 so that the pulse produced by the pulse generator 242 on the lead 248 causes a 0 to be entered into the first shift register stage 261. It should be understood that if a true input were applied to the input 254 then a 1 would be entered into the first shift register stage 261. Activation of the pulse generator 242 causes its output to go to a true level, thereby enabling the gates 227$x$, 227$y$ and 227$z$ so that signals dependent on the reset outputs $\overline{X}_n$, $\overline{Y}_n$, $\overline{Z}_n$ of the flip-flops 220$x$, 220$y$ and 220$z$ (i.e., false, false and true respectively) are respectively applied to the trigger inputs of the flip-flops 215$x$, 215$y$ and 215$z$. Therefore, the flip-flops 215$x$ and 215$y$ remain set in their true states, whereas the flip-flop 215$z$ is triggered to its false state so that the AND gate 240 is disabled by signal $Z_{n-1}$. The output of the delay device 252 is now effective to reset the flip-flops 220$x$, 220$y$ and 220$z$ to their false states. It should be understood that the duration of the pulse produced by the pulse generator 242 is less than that of the pulse produced by any one of the devices 212$x$, 212$y$, 212$z$, so that if a pulse is initiated by one of the devices 212$x$, 212$y$, 212$z$ during a decoding operation (i.e., while the output of the pulse generator 242 is true), the trailing edge of this pulse will be effective to trigger one of the relevant flip-flops after the completion of the decoding operation.

When the probe reaches the position 3 (FIG. 6), the point 72 has crossed the boundary 303 and the points 70 and 71 have crossed the next boundary 305. Upon the point 72 crossing the boundary 303, a true pulse is applied to the trigger input of the flip-flop 215$z$ via the AND gate 213$z$, thereby setting the flip-flop 215$z$ to its true state. The flip-flops 215$x$ and 215$y$ are not affected by the crossing of the boundary 305 by the points 70 and 71 since the AND gates 213$x$ and 213$y$ are disabled by the signals $\overline{X}_{n-1}$, $\overline{Y}_{n-1}$. Thus, the flip-flops 215$x$, 215$y$ and 215$z$ are now again all in their true states so that a new decoding operation is initiated. However, at this time the flip-flops 220$x$, 220$y$ have been set to their true states via leads 219$x$, 219$y$ and gates 218$x$, 218$y$ in response to the crossing of boundary 305 by points 70 and 71 so that the output of AND gate 230 is again false and a second 0 is entered into the shift register 250, the 0 previously entered being shifted one stage to the left by the pulse on the shift inputs. Signals corresponding to the reset outputs $\overline{X}_n$, $\overline{Y}_n$, $\overline{Z}_n$ of the flip-flops 220$x$, 220$y$, 220$z$ are again respectively applied to the trigger inputs of the flip-flops 215$x$, 215$y$, 215$z$ so that flip-flops 215$x$ and 215$y$ remain in their true states while flip-flop 215$z$ is set to its false state. The flip-flops 220$x$, 220$y$, 220$z$ are again reset to their false states by the output of the delay device 252.

When the probe reaches position 4 (FIG. 6) the point 72 has crossed the boundary 305 but the points 70 and 71 have not yet crossed the next boundary 307 since the probe is now sensing a wide bar. Upon the point 72 crossing the boundary 305, a true pulse is applied to the trigger input of the flip-flop 215$z$ via the AND gate 213$z$, thereby setting the flip-flop 215$z$ to its true state. A further decoding operation is now initiated since the flip-flops 215$x$, 215$y$, 215$z$ are again all in their true states. The crossing of the boundary 305 by the point 72 does not set flip-flop 220z to its true state since at that time the AND gate 218z is disabled by the false signal from output $Z_{n-1}$ of flip-flop 215z. Accordingly, at the time of this decoding operation all the flip-flops 220x, 220y, 220z are in their false states so that all the inputs to the AND gate 230 are now true. Thus a true signal is applied to the input 254 of the shift register 250, thereby causing a 1 to be entered into the first stage 261 of the shift register 250. Thereafter, the true pulse from pulse generator 242 is applied through gates 227x, 227y and 227z to the trigger input of flip-flops 215x, 215y and 215z, thereby resetting flip-flops 215x, 215y, and 215z.

In summary, therefore, the operation of the decoding circuit is such that whenever all three of the flip-flops 215x, 215y and 215z are in the set or true state a decoding operation is initiated, this decoding operation being effected by examining the states of the flip-flops 220x, 220y and 220z. If the latter flip-flops are all in the false state, a wide bar representing a binary 1 is detected. Otherwise, a narrow bar representing a binary 0 is detected. It should be understood that immediately after each decoding operation is initiated at least one of the flip-flops 215x, 215y, 215z is in a false state thereby disabling the AND gate 240 until such time as the signals $X_{n-1}$, $Y_{n-1}$, $Z_{n-1}$ again all become true, whereupon a new decoding operation is initiated.

The manner of the decoding of all the encoded data in the present example will be evident from an examination of TABLE I below:

TABLE I

| Probe position | Flip-flops 215x | 215y | 215z | 220x | 220y | 220z | Decoded bit |
|---|---|---|---|---|---|---|---|
| 1 | 0 | 0 | 0 | 0 | 0 | 0 | |
| 2(a) | 1 | 1 | 1 | 1 | 1 | 0 | 0 A |
| 2(b) | 1 | 1 | 0 | 0 | 0 | 0 | |
| 3(a) | 1 | 1 | 1 | 1 | 1 | 0 | 0 P |
| 3(b) | 1 | 1 | 0 | 0 | 0 | 0 | |
| 4(a) | 1 | 1 | 1 | 0 | 0 | 0 | 1 |
| 4(b) | 0 | 0 | 0 | 0 | 0 | 0 | |
| 5(a) | 1 | 1 | 1 | 1 | 1 | 0 | 0 |
| 5(b) | 1 | 1 | 0 | 0 | 0 | 0 | |
| 6(a) | 1 | 1 | 1 | 0 | 1 | 0 | 0 |
| 6(b) | 0 | 1 | 0 | 0 | 0 | 0 | |
| 7(a) | 1 | 1 | 1 | 0 | 0 | 0 | 1 |
| 7(b) | 0 | 0 | 0 | 0 | 0 | 0 | |
| 8(a) | 1 | 1 | 1 | 0 | 0 | 0 | 1 |
| 8(b) | 0 | 0 | 0 | 0 | 0 | 0 | |
| 9(a) | 1 | 1 | 1 | 0 | 1 | 0 | 0 |
| 9(b) | 0 | 1 | 0 | 0 | 0 | 0 | |
| 10(a) | 1 | 1 | 1 | 0 | 0 | 0 | 1 |
| 10(b) | 0 | 0 | 0 | 0 | 0 | | |
| 11(a) | 1 | 1 | 1 | 0 | 1 | 0 | 0 |
| 11(b) | 0 | 1 | 0 | 0 | 0 | 0 | |
| 12(a) | 1 | 1 | 1 | 0 | 0 | 0 | 1 B |
| 12(b) | 0 | 0 | 0 | 0 | 0 | 0 | |
| 13 | 1 | 1 | 1 | 0 | 0 | 0 | 1 |

Referring now to TABLE I, the states of the flip-flops 215x, 215y, 215z, 220x, 220y and 220z are shown at probe positions 1 to 13, FIG. 6, a ture state being indicated by a 1 and a false state by a 0. Under each probe position 2 to 12, line (a) shows the states of the flip-flops immediately after all three flip-flops 215x, 215y and 215z have been set to initiate a decoding operation, and line (b) shows the state of the same flip-flops after decoding has occurred, but before any further boundary crossings have been detected. It will be seen that the decoded bit is a 1 when the flip-flops 220 in the line (a) are all in a zero state, and is a 0 otherwise.

The last bit decoded (in probe position 13) is a 1 derived from sensing the background of the label. This 1 is not a significant part of the encoded data and can be ignored in subsequent processing of the sensed data.

The control circuit 270 is effective to produce an output signal when no further boundaries on the label are detected for a predetermined time. At this stage all the encoded bits on the label have been sensed and decoded and the shift register 250 contains a pattern of 0s and 1s corresponding to the encoded data. The control circuit 270 detects the value of the bit in the stage 262 of the shift register 250, corresponding to the last significant data bit which was sensed. If this bit is a 1 the label has been sensed in the forward direction, and if it is a 0 the label has been sensed in the reverse direction. The control circuit 270 is arranged, in accordance with the detected sensing direction, to control the direction in which the data is read out of the shift register 250.

Alternatively it would be possible to provide a shift register having a data input at each end and to control the selection of the data input in accordance with the first data bit detected. In such an arrangement, the shift register would have its contents always read out in the same direction. The read out of data from the shift register forms no part of the present invention and is not described in detail herein.

It will be appreciated from an inspection of FIG. 6 that correct decoding will take place even though the probe may rotate to a certain extend about its axis while it is traversing the label. Such rotation may even result in a sensor traversing back across a boundary which has already been crossed in the forward direction, provided that no decoding operation is initiated before this boundary is crossed again in the forward direction. The sensing of a reverse crossing of a boundary by a sensor thereof results in an additional triggering of the relevant flip-flop 220.

Although in the described embodiment a sensing device in the form of a probe having three sensing positions is employed, it will be appreciated that in cases where no relative rotary movement between a sensing device and the label is possible, for instance, if the label 10 were attached to a railway vehicle and the sensing device was stationary at the trackside, effective decoding of the data encoded in the manner shown in FIG. 2 could be achieved by sensing the light reflected from two spots 45, 46 which are spaced apart in the direction of the arrow 35 by a distance greater than the width of one of the narrow bars and less than the width of one of the wide bars, the two spots 45, 46 being arranged to scan the label along a line 47 which traverses the coded data.

It should further be understood that the data is not necessarily encoded in an optically sensible form. For instance bars selectively reflecting microwaves could be employed. Magnetic coding would also be possible, sensing being accomplished for instance by a device employing the Hall effect.

What is claimed is:

1. A code reading system for reading a record member having contiguous indicia of alternating first and second detectable characteristics, each of said indicia having a width along a given reading path which is either a first or a different second distance, said system comprising:

a leading and a lagging transition detecting means for detecting indicia characteristic changes of said record member, at least one of said transition detecting means detecting along said path, each of said transition detecting means providing a signal as it detects a characteristic change from one indicium to the next adjacent indicium, each of said transition detecting means detecting points on said member which are separated from one another along a line parallel to said path by a distance which is between said first and second distances, and logic means responsive to said signals provided by said transition detecting means for determining, after each leading transition detecting means signal is provided, whether the next occurring transition detecting means signal is provided by said leading or said lagging transition detecting means.

2. The invention according to claim 1 wherein said logic means includes first and second bistable means each capable of being set to a first state or a second state, said first and second bistable means being coupled together and responsive to said leading transition detecting means signal so that said first bistable means changes from said first state to said second state upon the occurrence of a leading transition detecting means signal and said second bistable means changes from said first state to said second state upon the occurrence of a leading transition detecting means signal as long as said first bistable means is in said second state, said first bistable means further being responsive to the occurrence of a lagging transition detecting means signal by changing states whenever said second bistable means is in said first state, and said second bistable means being set to said first state whenever said lagging transition detecting means signal occurs.

3. The invention according to claim 2 wherein said logic means further includes means responsive to the state of said seocnd bistable means at the time of occurrence of each lagging transition detecting means signal for providing a signal indicating the width order of said indicia on said member.

4. The invention according to claim 1:

wherein said first and second detectable characteristics are colors; and wherein each of said leading and lagging transition detecting means include light responsive means for detecting a color change at the respective points on said member which are detected thereby.

5. A code reading system for reading a record member having contiguous indicia of alternating first and second detectable characteristics, each of said indicia having a width along a given path which is either a first or a wider second distance, those indicia having said frst distance width manifesting binary digits of a first value and those indicia having said second distance width manifesting binary digits of a second value, said system comprising:

probe means, including first, second and third detecting means, for being scanned along said given path, each of said detecting means being positioned within said probe means at the vertices of a triangle and detecting any instantaneous characteristic change at associated first, second and third points of said member as said probe means scans said given path, said first, second and third detecting means further being arranged within said probe means so that all of said first, second and third points are (1) incapable of being contained within an indicium of said first distance width, (2) incapable of spanning two contiguous indicia and (3) are capable of being contained within an indicium of said second distance width, said first, second and third detecting means each providing a respective signal whenever it first detects a given indicium and whenever it first detects the next contiguous indicium and logic means responsive to said first, second and third detecting means signals for determining whether any of said detecting means has detected the next contiguous indicium before all of said detecting means have detected said given indicium and in response to said determination for providing a signal manifesting the binary digits manifested by the indicia of said record member.

6. The invention according to claim 5 wherein said logic means further includes:

first, second and third logic circuits, each one of which is associated with and responsive to a respective one of said first, second and third detecting means signals, each of said logic circuits including first and second bistable means each capable of assuming either a first state or a second state and each responsive to the occurrence of the detecting means signal associated therewith, said first and second bistable means of each logic circuit being connected so that said first bistable means changes from said first state to said second state upon the occurrence of each detecting means signal applied thereto while in said first state, and so that said second bistable means changes from said first second state to said state upon the occurrence of each detecting means signal applied thereto so long as said first bistable means is in said second state;

decoding means responsive to the state of the first bistable means of each of said first, second and third logic circuits for providing a signal upon the occurrence of each of said first bistable means of said first, second and third logic circuits being in said second state; and data providing means for providing a data signal manifesting the binary data manifested by said record member in response to said decoding means signal and the state of the second bistable means of each of said first, second and third logic circuits, said data signal manifesting said first value if at least any one of said second bistable means is in said second state at the time said decoding means signal occurs and said second value if all of said second bistable means are in said first state at the time said decoding means signal occurs.

7. The invention according to claim 6:

wherein the first bistable means of said first, second and third logic circuits respond to said decoding means signal by changing states as long as the second bistable means in the same logic circuit therewith is in said first state; and wherein the second bistable means of said first, second and third logic circuits respond to a delayed version of said decoding means signal by assuming said first state.

8. The invention according to claim 7 wherein said data providing means includes a shift register for storing binary data, said shift register being responsive to said decoding means signal and said data signal, each binary digit of said data signal being applied to and stored by a first stage thereof and said decoding means signal causing the binary digits stored by said shift register to be shifted one stage.

9. The invention according to claim 8:

wherein said record member is capable of being scanned in either a forward or a reverse direction;

wherein said indicia are arranged on said record member so that for a forward direction scan the initial indicia detected has one of said first or second widths and the final indicia detected has the other one of said first or second widths; and wherein said system further includes means responsive to at least one of the data bits manifesting said initial or final indicia for causing said data signal to be provided as if a forward direction scan had occurred.

10. A code reading system for reading a record member having contiguous indicia of alternating first and second detectable characteristics, each of said indicia having a width along a given reading path which is either a first or a different second distance, said system comprising:

a leading and a lagging transition detecting means for detecting indicia characteristic changes of said record member, at least one of said transition detecting means detecting along said path, each of said transition detecting means providing a signal as it detects a characteristic change from one indicium to the next adjacent indicium, each of said transition detecting means detecting points on said member which are separated from one another along said path by a distance which is between said first and second distances, and logic means responsive to said leading and said lagging detecting means signals for determining whether said leading detecting means has detected the next contiguous indicium before said lagging detector means has detected said given indicium and in response to said determination for providing a signal manifesting the binary digits manifested by the indicia of said record member.

11. The invention according to claim 10 wherein said logic means is responsive to said leading and said lagging detecting means signals for determining after a given indicium is detected by said leading detecting means whether or not said leading detecting means has detected the next contiguous indicium before said lagging detecting means has detected the given indicium, and if it has, then in response to this affirmative determination, said logic means provides a first signal manifesting a first binary digit when said lagging detecting means has detected the given indicium, and if it has not, then in response to this negative determination, said logic means provides a second signal manifesting a second binary digit when said lagging detecting means has detected the given indicium, a series of said first and second signals manifesting the binary digits manifested by the indicia of said record member.

12. The invention according to claim 10 wherein said logic means further includes:

first and second logic circuits, each one of which is associated with and responsive to a respective one of said leading and said lagging detecting means signals, each of said logic circuits including first and second bistable means each capable of assuming either a first state or a second state and each responsive to the occurrence of the detecting means signal associated therewith, said first and second bistable means of each logic circuit being connected so that said first bistable means changes from said first state to said second state upon the occurrence of each detecting means signal applied thereto while in said first state, and so that said second bistable means changes from said first state to said second state upon the occurrence of each detecting means signal applied thereto so long as said first bistable means is in said second state;

decoding means responsive to the state of the first bistable means of each of said first and second logic circuits for providing a signal upon the occurrence of each of said first bistable means of said first and second logic circuits being in said second state; and data providing means for providing a data signal manifesting the binary data manifested by said record member in response to said decoding means signal and the state of the second bistable means of each of said first and second logic circuits, said data signal manifesting said first value if at least any one of said second bistable means is in said second state at the time said decoding means signal occurs and said second value if all of said second bistable means are in said first state at the time said decoding means signal occurs.

* * * * *